US012579896B2

(12) United States Patent
Shikerman et al.

(10) Patent No.: US 12,579,896 B2
(45) Date of Patent: Mar. 17, 2026

(54) REMOTE SUPERVISION OF MULTIPLE AUTONOMOUS AIRCRAFT

(71) Applicant: Wisk Aero LLC, Mountain View, CA (US)

(72) Inventors: Mark Shikerman, San Francisco, CA (US); Marco Delgado, Portland, OR (US); Davide Pierini, Menlo Park, CA (US)

(73) Assignee: Wisk Aero LLC, Mountain View, CA (US)

( * ) Notice: Subject to any disclaimer, the term of this patent is extended or adjusted under 35 U.S.C. 154(b) by 91 days.

(21) Appl. No.: 18/469,965

(22) Filed: Sep. 19, 2023

(65) Prior Publication Data

US 2024/0096224 A1 Mar. 21, 2024

Related U.S. Application Data

(60) Provisional application No. 63/408,088, filed on Sep. 19, 2022.

(51) Int. Cl.

*G08G 5/30* (2025.01)
*G08G 5/55* (2025.01)
*G08G 5/57* (2025.01)

(52) U.S. Cl.

CPC ................. *G08G 5/30* (2025.01); *G08G 5/55* (2025.01); *G08G 5/57* (2025.01)

(58) Field of Classification Search

CPC .. G08G 5/30; G08G 5/55; G08G 5/57; G08G 5/26; G08G 5/22; G08G 5/56; G08G 5/727; G08G 5/80; G08G 5/34

See application file for complete search history.

(56) References Cited

U.S. PATENT DOCUMENTS

| | | | |
|---|---|---|---|
| D716,821 | S | 11/2014 | Wood |
| 9,007,327 | B1 | 4/2015 | Raghu et al. |

(Continued)

FOREIGN PATENT DOCUMENTS

| | | |
|---|---|---|
| CN | 304711047 | 7/2018 |
| CN | 307390533 | 6/2022 |

(Continued)

OTHER PUBLICATIONS

Calhoun, G.L., Draper, M.H. (2015). Display and Control Concepts for Multi-UAV Applications. In: Valavanis, K., Vachtsevanos, G. Handbook of Unmanned Aerial Vehicles. Springer, Dordrecht. https://doi.org/10.1007/978-90-481-9707-1_88; https://link.springer.com/rwe/10.1007/978-90-481-9707-1_88#Sec3 (Year: 2015).*

(Continued)

*Primary Examiner* — Brian P Sweeney

(74) *Attorney, Agent, or Firm* — Kilpatrick Townsend & Stockton LLP

(57) ABSTRACT

Embodiments provide a flight supervision platform including a server computer and an animated graphical user interface for simultaneously monitoring multiple autonomous aircraft. More specifically, techniques disclosed herein provide a flight supervision platform that allows for one-to-many supervision where a remote supervisor (e.g., human or artificial intelligence) may continuously monitor and/or interact with a plurality of autonomous aircraft. For example, the autonomous aircraft may include one or more autonomous electric vertical takeoff landing (eVTOL) aircraft. The flight supervision platform may display information and receive input via the GUI and transmit commands based on the received input to the autonomous aircraft.

18 Claims, 12 Drawing Sheets

(56) References Cited

U.S. PATENT DOCUMENTS

| | | | |
|---|---|---|---|
| D729,829 | S | 5/2015 | Amin et al. |
| D740,842 | S | 10/2015 | Liu et al. |
| D749,125 | S | 2/2016 | Meegan et al. |
| D757,053 | S | 5/2016 | Nadiadi et al. |
| D776,127 | S | 1/2017 | Kim et al. |
| D781,326 | S | 3/2017 | Bray et al. |
| D790,560 | S | 6/2017 | Inose et al. |
| D805,531 | S | 12/2017 | Hersh et al. |
| D808,421 | S | 1/2018 | Yamasaki et al. |
| D810,760 | S | 2/2018 | Doyle et al. |
| D813,250 | S | 3/2018 | Hiljanen et al. |
| D842,318 | S | 3/2019 | Jäger et al. |
| D845,973 | S | 4/2019 | Jaycobs |
| D847,178 | S | 4/2019 | Kato et al. |
| D862,506 | S | 10/2019 | Penha et al. |
| D965,617 | S | 10/2022 | Song et al. |
| D977,515 | S | 2/2023 | Kim et al. |
| D979,578 | S | 2/2023 | Saget et al. |
| D980,247 | S | 3/2023 | Gogna et al. |
| D985,015 | S | 5/2023 | Kanamaru et al. |
| D985,589 | S | 5/2023 | Lee et al. |
| D985,615 | S | 5/2023 | Lee et al. |
| D1,004,603 | S | 11/2023 | Song et al. |
| D1,005,304 | S | 11/2023 | Sajbel et al. |
| D1,009,056 | S | 12/2023 | Elder et al. |
| D1,013,717 | S | 2/2024 | Ishii et al. |
| D1,019,702 | S | 3/2024 | Schaefer et al. |
| D1,023,041 | S | 4/2024 | Dhaliwal et al. |
| 2007/0244608 | A1 | 10/2007 | Rath et al. |
| 2013/0211635 | A1 | 8/2013 | Bourret et al. |
| 2015/0051783 | A1 | 2/2015 | Tamir et al. |
| 2015/0081197 | A1 | 3/2015 | Gaertner et al. |
| 2015/0339931 | A1 | 11/2015 | Yu et al. |
| 2016/0027310 | A1 | 1/2016 | Samuthirapandian et al. |
| 2016/0063869 | A1 | 3/2016 | Kathirvel et al. |
| 2016/0107766 | A1 | 4/2016 | He et al. |
| 2016/0307447 | A1 | 10/2016 | Johnson et al. |
| 2017/0339337 | A1 | 11/2017 | Kim et al. |
| 2018/0164801 | A1 | 6/2018 | Kim et al. |
| 2018/0301041 | A1 | 10/2018 | Chen |
| 2019/0016475 | A1 | 1/2019 | Zhong et al. |
| 2019/0250601 | A1 | 8/2019 | Donahoe et al. |
| 2019/0371183 | A1 | 12/2019 | Mecklem et al. |
| 2020/0073385 | A1 | 3/2020 | Jobanputra et al. |
| 2020/0202732 | A1 | 6/2020 | Mecklem et al. |
| 2021/0366292 | A1 | 11/2021 | Braaten |
| 2022/0130263 | A1 | 4/2022 | Neis et al. |
| 2022/0230547 | A1 | 7/2022 | Miller |
| 2022/0415188 | A1* | 12/2022 | Zhang ...................... G08G 5/34 |
| 2023/0162610 | A1 | 5/2023 | Beaudouin-Iafon et al. |
| 2023/0221721 | A1 | 7/2023 | Konno |

FOREIGN PATENT DOCUMENTS

| | | | |
|---|---|---|---|
| CN | 307556461 | | 9/2022 |
| CN | 307600571 | | 10/2022 |
| JP | 2019131734 | A | 8/2019 |
| WO | 2016103424 | A1 | 10/2017 |
| WO | 2021133543 | A1 | 7/2021 |

OTHER PUBLICATIONS

"Realtime", Available Online at: https://shorturl.at/LswUW, Oct. 10, 2023, 1 page.

"Sesar Erica Research Project Demonstrates Detect and Avoid in Live Flight Demonstration", Avaiable online at: https://www.unmannedairspace.info/latest-news-and-information/sesar-erica-research-project-demonstrates-detect-and-avoid-in-live-flight-demonstration/, Nov. 2, 2022, 2 Pages.

U.S. Appl. No. 29/853,825 , "Ex Parte Quayle Action", Aug. 21, 2024, 8 pages.

Bellamy , "Synturian Ready for Ai, Manned-unmanned Teaming Applications", Available online at: https://www.aviationtoday.com/2018/10/11/synturian-ready-ai-manned-unmanned-teaming-applications/, Oct. 11, 2018, 2 pages.

Meyers, "En Route to Gps-based Air Traffic Control (Images)", Available online at: https://www.cnet.com/pictures/en-route-to-gps-based-air-traffic-control-images/, Dec. 31, 2009, 1 page.

PCT/US2024/012597 , "International Search Report and Written Opinion", Apr. 30, 2024, 11 pages.

PCT/US2023/078532 , "International Search Report and Written Opinion", Feb. 14, 2024, 10 pages.

NZ431909 , "First Examination Report", Apr. 5, 2023, 3 pages.

PCT/US2023/033120 , "International Search Report and the Written Opinion", Dec. 18, 2023, 11 pages.

U.S. Appl. No. 18/500,865 , Non-Final Office Action, Mailed On Aug. 25, 2025, 9 pages.

U.S. Appl. No. 18/420,158 , Non-Final Office Action, Mailed On Oct. 6, 2025, 29 pages.

Application No. JP2023-005214 , Office Action, Mailed On Dec. 9, 2025, 5 pages.

* cited by examiner

REMOTE SUPERVISION OF MULTIPLE AUTONOMOUS AIRCRAFT

CROSS-REFERENCES TO OTHER APPLICATIONS

This application claims priority under 35 USC§ 119(e) to and benefit of U.S. Provisional Patent Application No. 63/408,088 filed Sep. 19, 2022 and entitled "Remote Supervision of Multiple Autonomous Aircraft", the disclosure of which is incorporated by reference herein in its entirety for all purposes.

This application is related to the US design patent application titled "Multi Vehicle Supervisor Interface", filed Sep. 19, 2022.

SUMMARY

Embodiments provide techniques for safely and efficiently monitoring and supervising many autonomous aircraft at the same time. According to various embodiments, a graphical user interface (GUI) is provided for simultaneously monitoring, supervising, and/or communicating (e.g., interacting) with multiple autonomous aircraft. The GUI may be an animated GUI including graphical representations of the aircraft and related information displayed over (e.g., laid over) a map representing the area over which the autonomous aircraft are flying. The GUI may further include a flight guidance pane for transmitting commands modifying flight parameters of a monitored autonomous aircraft. In some embodiments, the flight guidance pane may always be displayed in connection with a particular supervisor using the GUI.

According to various embodiments, a computer-implemented method is provided for monitoring and interacting with a plurality of autonomous aircraft. The method comprises displaying, using a computer device, a graphical user interface (GUI) on a display device; and representing a plurality of autonomous aircraft with a plurality of icons on a first pane of the GUI. Information associated with each one of the plurality of autonomous aircraft is displayed in a plurality of sections on a second pane of the GUI. The method further includes receiving a selection of one of a first icon among the plurality of icons on the first pane of the GUI or a first section among the plurality of sections on the second pane of the GUI. The method also includes identifying other one of the first icon among the plurality of icons on the first pane of the GUI or the first section among the plurality of sections on the second pane of the GUI. The first icon and the first section are displayed using one or more visual cues to differentiate the first icon and the first section from remaining graphical elements. The method further includes transmitting a command or a message to an autonomous aircraft represented with the first icon on the GUI.

Various embodiments provide a system (e.g., a flight supervision platform) for monitoring and interacting with a plurality of autonomous aircraft. The system comprises a display screen, and a server computer including one or more processors, and a memory storing instructions that, when executed by the one or more processors, cause the one or more processors to perform the methods described above.

Some embodiments provide one or more computer-readable storage media storing instructions that, upon execution on a flight supervision platform having a server computer, cause the server computer to perform the methods described above.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Unless it is evident to the contrary from the description, where elements in different figures use identical reference numbers, the elements are generally either identical or at least similar in function or purpose.

DETAILED DESCRIPTION

Figure 1:
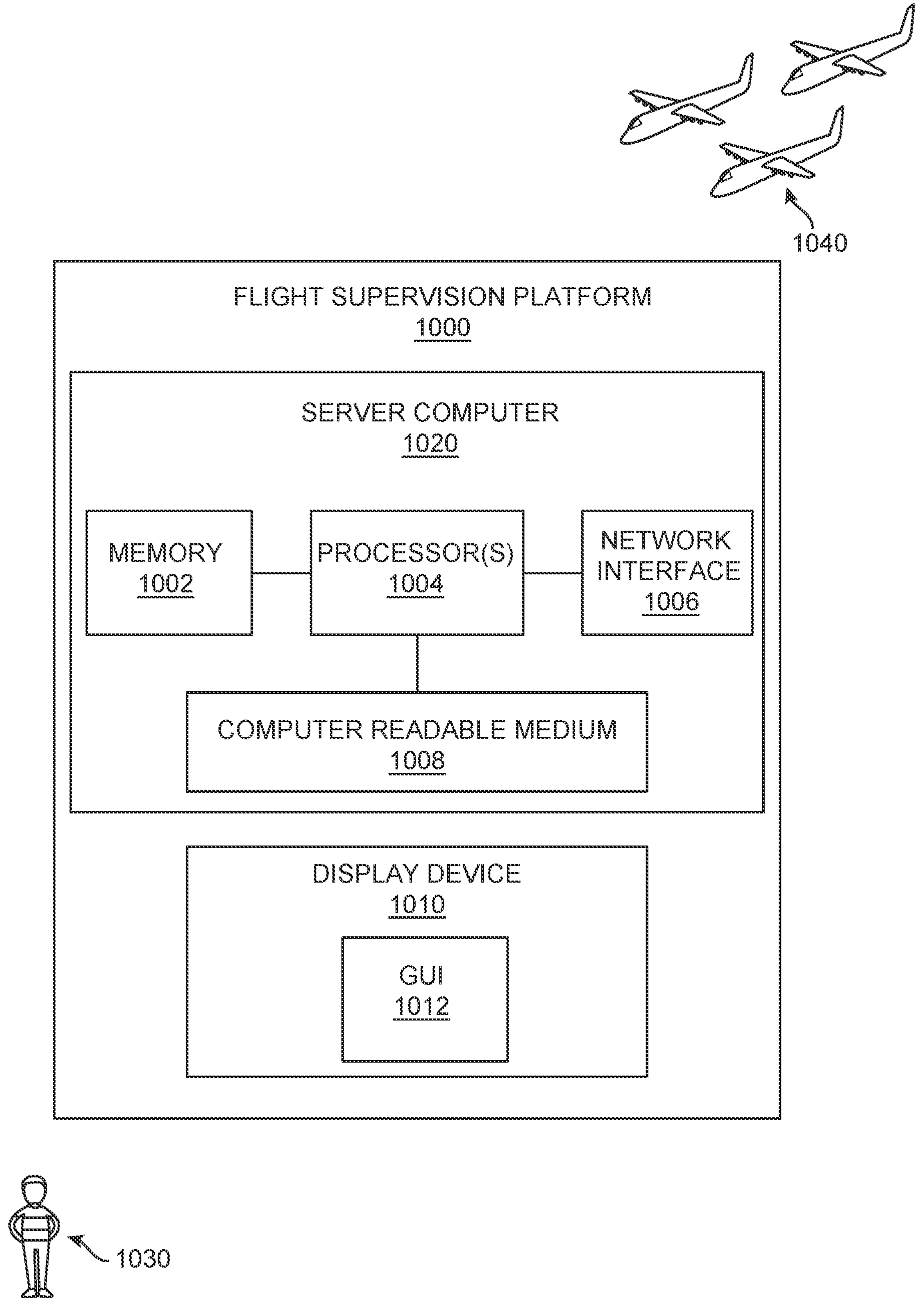
FIG. 1 illustrates a block diagram of an exemplary flight supervision platform for monitoring and interacting with multiple autonomous aircraft, according to various embodiments.

Techniques disclosed herein relate generally to an animated graphical user interface for simultaneously monitoring multiple autonomous aircraft. More specifically, techniques disclosed herein provide a platform (e.g., a flight supervision platform) that allows for one-to-many supervision where a remote supervisor (e.g., human or artificial intelligence) may continuously monitor and/or interact with a plurality of autonomous aircraft. The interaction may include sending a command to the autonomous aircraft using a GUI component of the platform. For example, the autonomous aircraft may include one or more autonomous electric vertical takeoff landing (eVTOL) aircraft. Various inventive embodiments are described herein, including methods, processes, systems, devices, and the like.

Several illustrative embodiments will now be described with respect to the accompanying drawings, which form a part hereof. The ensuing description provides embodiment (s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Embodiments provide a flight supervision platform including a server computer and an animated graphical user interface (GUI) for supervising, monitoring, and/or communicating with one or more autonomous aircraft. For example, a human operator may be able to simultaneously supervise multiple autonomous aircraft using the flight supervision platform including the animated GUI displayed on a display device on the ground (e.g., a monitoring center remote to the autonomous aircraft). The supervisor may transmit commands to change one or more of the flight parameters (e.g., altitude, attitude, air speed, heading) of an autonomous aircraft.

According to various embodiments, the autonomous aircraft are configured to implement self-flying technology that implements autopilot functions, precision navigation, detect and avoid capabilities, among other technologies. The flight supervision platform described herein provide an oversight to the autonomous aircraft and provide an ability to intervene when needed. The flight supervision platform (e.g., a multi-vehicle supervising platform) may oversee a flight from start to finish. During the flight, if the autonomous aircraft takes steps to avoid potential hazards that are outside of the assigned flight plan, the flight supervision platform received a notification or alert, that is then displayed on the GUI. The flight supervision platform allows a supervisor (e.g., a human supervisor) to intervene at any point during the flight by sending a new command for the autonomous aircraft to execute. For example, the supervisor can send a command to the aircraft to redirect the aircraft to an alternate landing site using the flight supervision platform.

FIG. 1 illustrates a block diagram of a flight supervision platform 1000 that can be used by a supervisor 1030 (e.g., a human supervisor 1030) to monitor and interact with one or more autonomous aircraft 1040 individually and/or collectively. The flight supervision platform 1000 may include a server computer 1020 comprising one or more processors 1004, a system memory 1002 (which may comprise any combination of volatile and/or non-volatile memory such as, for example, buffer memory, RAM, DRAM, ROM, flash, or any other suitable memory device), and a network interface (e.g., an external communication interface) 1006. In some embodiments, one or more of the modules may be disposed within one or more of the components of the system memory 1002, or may be disposed externally. The software and hardware modules shown in FIG. 1 are provided for illustration purposes only, and the configurations are not intended to be limiting. The processors 1004, system memory 1002 and/or external communication interface 1006 may implement the techniques and/or methods described herein.

The network interface 1006 may be configured or programmed to receive and generate electronic messages comprising information transmitted through the flight supervision platform 1000 to or from the plurality of autonomous aircraft 1040.

The flight supervision platform 1000 may also include at least one display device 1010 for displaying a graphical user interface (GUI) 1012. When an electronic message is received by the flight supervision platform 1000 via external communication interface 1006 of the server computer 1020, it may be processed and relevant information may be displayed on the display device 1010 via the GUI 1012. When an input is received from the supervisor 1030 via the GUI 1012, it may be processed and relevant information may be transmitted to the corresponding autonomous aircraft 1040. According to various embodiments, the flight supervision platform 1000 may further be configured to receive supplementary information from third parties, such as air traffic control, weather, other aircraft (e.g., aircraft that monitors the one or more autonomous aircraft 1040 in the air). The supplementary information may be processed by the flight supervision platform 1000 and displayed on the GUI 1012.

Figure 2A:
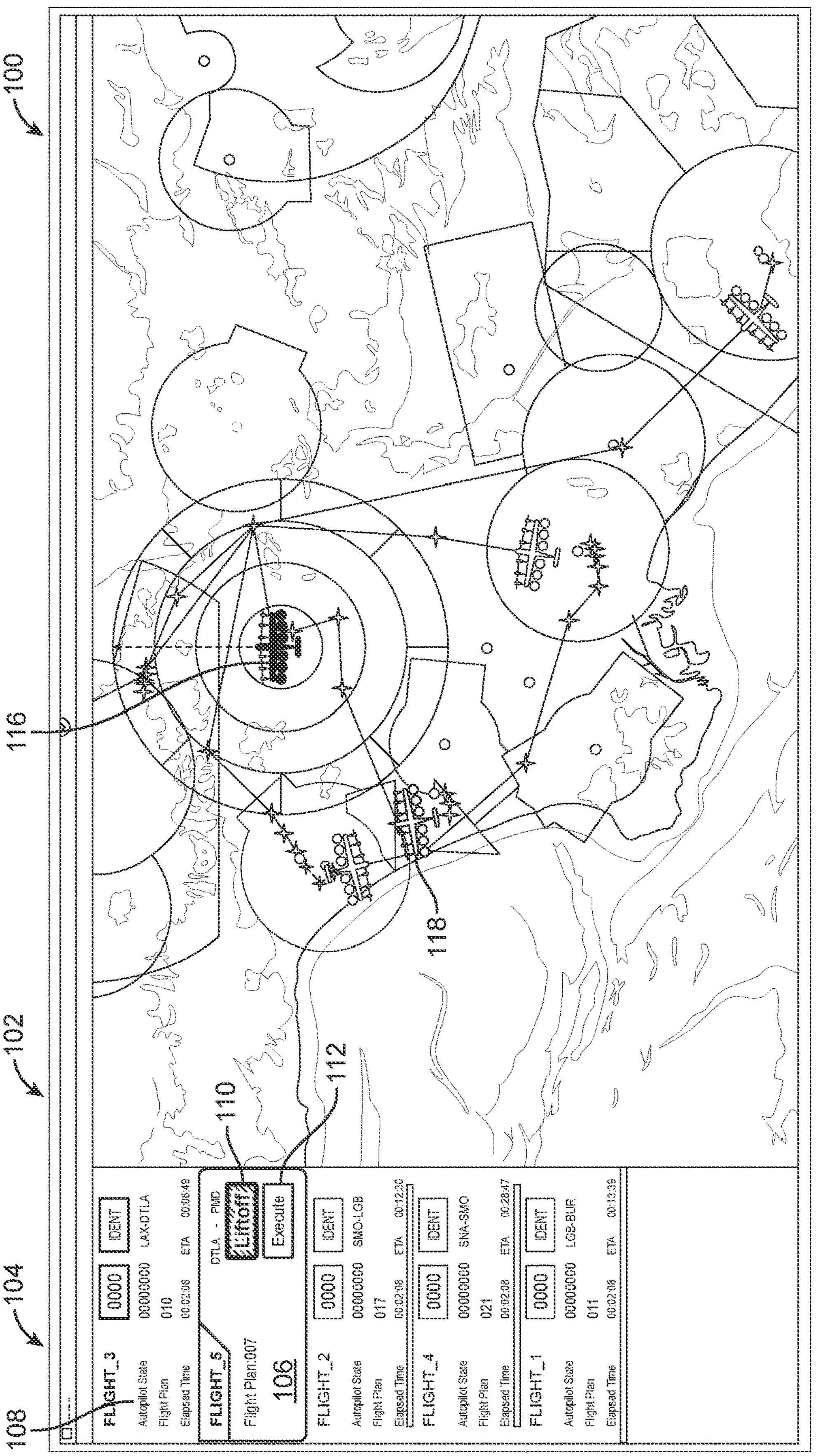
FIG. 2A illustrates an exemplary animated graphical user interface (GUI) of the flight supervision platform for supervising and interacting with multiple autonomous aircraft, according to various embodiments.

FIG. 2A illustrates an exemplary animated graphical user interface (GUI) 100 of the flight supervision platform 1000 for supervising and interacting with multiple autonomous aircraft, according to various embodiments. In the exemplary GUI 100, the supervisor (e.g., supervisor 1030 illustrated in FIG. 1) is overseeing five autonomous aircraft illustrated using five aircraft icons on the GUI 100. The GUI 100 may include a first pane 102 illustrating each autonomous aircraft with a corresponding aircraft icon 116, 118 overlaid on a map of the terrain over which the autonomous aircraft are flying, hovering and/or waiting on the ground on stand-by. The amount of detail to be included on the map may be determined using human factors including, for example, an assessment of how much information can be safely processed by a human on a screen. Some embodiments may use artificial intelligence (AI) as supervisors, or a combination of AI and human supervisors. The amount of detail to be included on the map may vary depending on the capabilities of the supervising entity. In some embodiments, the supervisor The GUI 100 may also include a second pane 104 including a section 106, 108 corresponding to each of the aircraft icons 116, 118 illustrated in the first pane 102. That is, each section 106, 108 provides information associated with a different autonomous aircraft under the supervision of the supervisor. In some embodiments, when the supervisor selects an autonomous aircraft by, for example, clicking on the desired aircraft icon 116, visual cues may associate the selected aircraft icon 116 displayed on the first pane 102 with the corresponding information section 106 displayed on the second pane 104. For example, the selected aircraft icon 116 and the corresponding information section 106 may be displayed in a color, shade, and/or font that is different than the rest of the graphical elements of the GUI. The selected aircraft icon 116 and the information section 106 represent the same autonomous aircraft (e.g., autonomous aircraft 1040 illustrated in FIG. 1). According to various embodiments, GUI 100 may display only the active missions (e.g., missions having an active status) supervised by the supervisor. There may be additional missions that are assigned to the supervisor (e.g., missions that are not yet active or missions that are in state of preparing for flight), and their information may be displayed on appropriate panes 102, 104 of GUI 100 after the supervisor accepts the missions or after the missions assume an active status.

In some embodiments, selecting the aircraft icon 116 on the first pane 102 may result in the corresponding information section 106 being automatically selected on the second pane 104. Alternatively, selecting the corresponding information section 106 on the second pane 104 may result in the aircraft icon being automatically selected on the first pane 102. When the server computer (e.g. server computer 1020 illustrated in FIG. 1) coupled to the GUI receives a selection of the aircraft icon 116 among the plurality of icons on the first pane 102 of the GUI 100 or a selection of the information section 106 among the plurality of sections on the second pane 104 of the GUI 100, the server computer identifies other one of the aircraft icon 116 or the first section 106 on the GUI 100. The aircraft icon 116 and the information section 106 are then displayed using one or more visual cues to differentiate the aircraft icon 116 and the information section 106 from remaining graphical elements.

Displaying the aircraft icon and the information section at separate locations of the GUI enables for accurate identification and selection of the intended autonomous aircraft represented using the aircraft icon and the information section. For example, if two autonomous aircraft are flying on top of each other, their representations (e.g., aircraft icons) on the map are likely to be displayed overlaid over each other. Therefore, it may not be possible or readily available to the supervisor to select one of the overlaid autonomous aircraft using the first pane 102. In such cases, the supervisor may select the autonomous aircraft that they would like to interact with using the corresponding section on the second pane 104. This way, selection of the intended aircraft is ensured.

As shown in the exemplary embodiments illustrated in accompanying figures, the first pane 102 is allocated a larger real-estate on the screen than the second pane 104. This allocation of real-estate allows for displaying the aircraft icons on a larger map (e.g., while also being able to display associated information on a separate section of the screen (e.g., the second pane 104) without cluttering the display on the map. The relative positioning and size of the first pane 102 and the second pane 104 may vary according to various embodiments.

The flight supervision platform 1000, through the GUI 100, allows the supervisor to interact with all the autonomous aircraft illustrated thereon with corresponding aircraft icons 116, 118 or information sections 106, 108. Prior to taking off, an autonomous aircraft may autonomously perform pre-flight inspection including checking one or more of power systems, control surfaces, avionics, passenger equipment, cabin systems and/or the environment around the autonomous aircraft. The autonomous aircraft may continuously monitor these systems and/or items during flight as well. The autonomous aircraft may inform (e.g., transmit data and/or messages to) the flight supervision platform 1000 (and thereby the supervisor 1030) when the checks are completed, and the autonomous aircraft as well as the passengers (where applicable) are ready for takeoff.

Figure 2B:
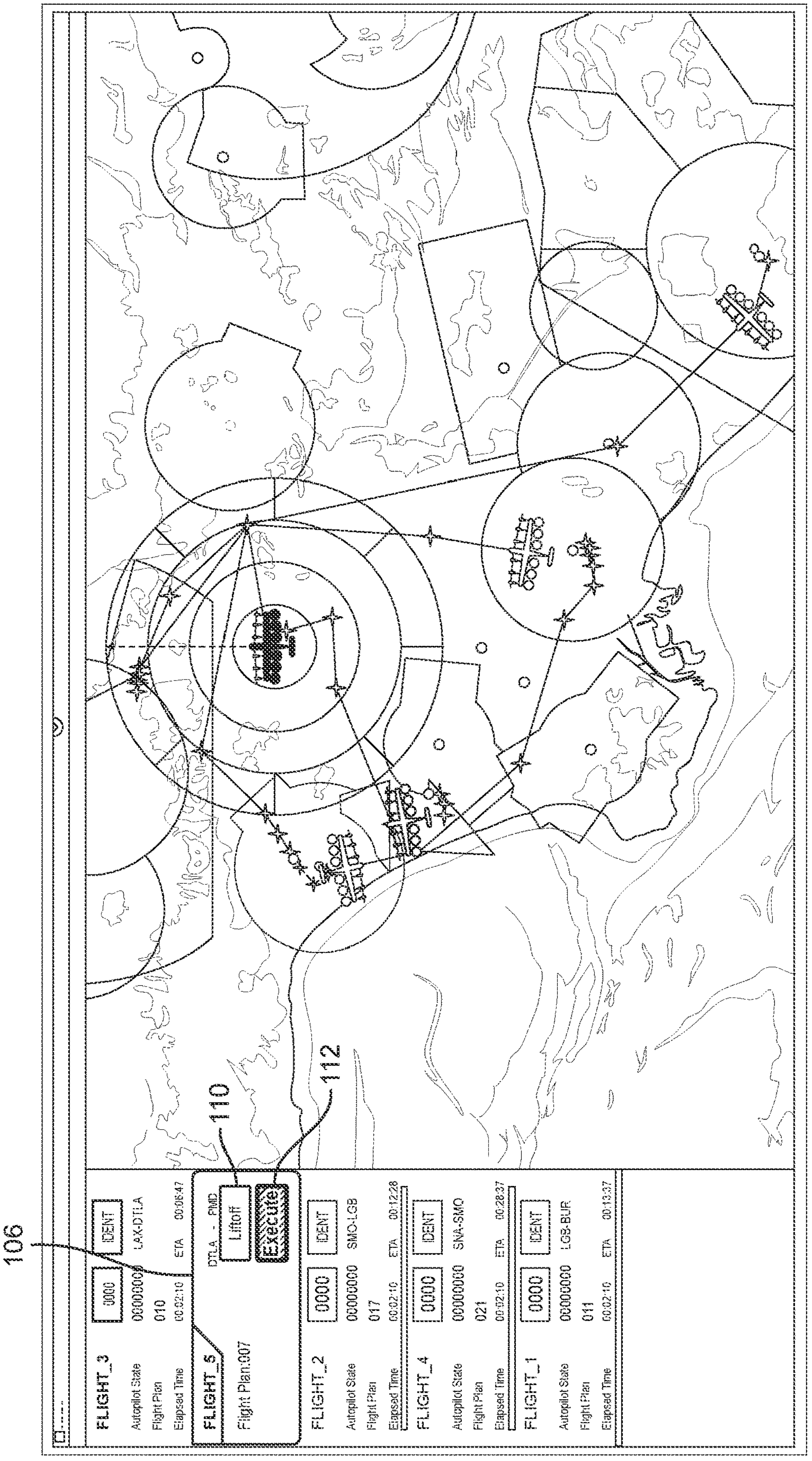
FIG. 2B illustrates another view of the exemplary animated GUI of the flight supervision platform, according to various embodiments.

After receiving notification that the autonomous aircraft is ready for takeoff, and/or a route is assigned to the autonomous aircraft (further discussed below in connection with FIG. 3), the supervisor may first select the aircraft icon 116 corresponding to the autonomous aircraft on the first pane 102, send a liftoff command to the autonomous aircraft by, for example, selecting a first (e.g., liftoff) button 110 on the second pane 104 (e.g., as shown in FIG. 2A, the selected liftoff button 110 is displayed using a visual cue such as boldface font, to indicate that the button has been selected), followed by selecting a second (e.g., execute) button 112 on the second pane 104 (e.g., as shown in FIG. 2B, the selected execute button 112 is displayed using a visual cue such as boldface font, to indicate that the button has been selected) to confirm the liftoff command being sent to the selected aircraft. The two-step selection including selection of two separate buttons for sending a command to the autonomous aircraft may ensure that the command is being sent intentionally. Accordingly, the server computer 1020 may receive a selection of the aircraft icon 116 on the first pane 102 of the GUI 100, and may receive the liftoff command followed by the execute command from the second pane 104 the GUI 100. The server computer 1020 may then transmit the liftoff command to the autonomous aircraft represented using the aircraft icon 116 on the GUI 100.

In the embodiment illustrated in FIGS. 2A and 2B, no additional pop-up windows are displayed when the supervisor selects an icon on the first pane of the GUI or an information section on the second pane of the GUI. This eliminates the clutter on the GUI and reduces the distraction for the supervisor. In some embodiments, pop-up windows, or changing layouts of the GUI may be prevented to reduce or eliminate distractions for the supervisor.

In some embodiments, while the autonomous aircraft is following an assigned route, the supervisor may receive an instruction from air traffic control (ATC) that needs to be relayed to the autonomous aircraft under supervision. The display of the GUI is optimized for the supervisor to quickly identify the correct autonomous aircraft and relay the ATC communication to the correct autonomous aircraft.

In some embodiments, the supervisor may locate the autonomous aircraft on the map displayed on the first pane 102 and determine whether the ATC communication is applicable. For example, if the map shows the autonomous aircraft on a mountainous terrain that is not safe for a maneuver suggested in the ATC communication, the supervisor may confirm the maneuver with the ATC prior to relaying it to the autonomous aircraft or may determine that the communication is erroneous and should be discarded based on the information provided to the supervisor using the map displayed on the GUI 100.

Referring back to FIG. 2A, while four of the aircraft may be already in the air, following a route, a fifth aircraft represented with the aircraft icon 116 may be on the ground, waiting for a route assignment. According to various embodiments, the supervisor may communicate instructions to an aircraft such as assigning a route, giving liftoff instructions, etc. The autonomous aircraft executes a flight plan to follow the route upon receiving route assignment.

Figure 3:
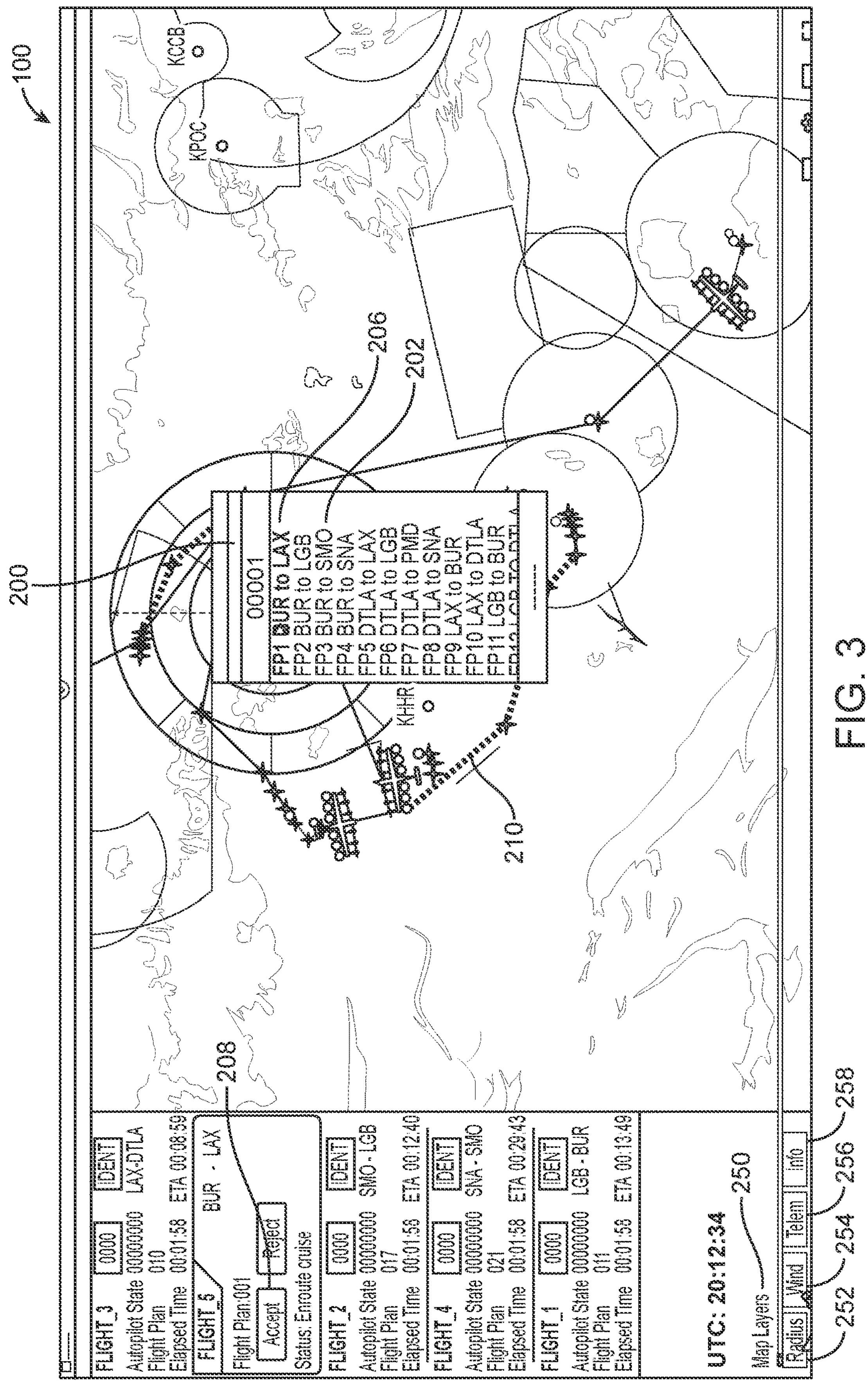
FIG. 3 illustrates an exemplary technique for assigning a route to an autonomous aircraft using the exemplary animated GUI of the flight supervision platform, according to various embodiments.

FIG. 3 illustrates an exemplary technique for assigning a route to an autonomous aircraft using the exemplary animated GUI of the flight supervision platform, according to various embodiments. GUI 100 may also be used to assign a flight path to an autonomous aircraft. For example, the autonomous aircraft could be on the ground waiting for a flight assignment. The supervisor may select the autonomous aircraft either by selecting the aircraft icon 116 or the information section 106 representing the aircraft on the ground (as shown in FIGS. 2A and 2B). The selection of an autonomous aircraft on the ground may trigger the GUI 100 to display a list of available routes 202 using a menu 200.

One of ordinary skill in the art will appreciate that the graphical elements illustrated in the figures for providing information or receiving input from the supervisor are not limited to the means shown in the figures, and alternative means may be used to convey the same information or receive the same input. For example, the menu 200 may include a scroll-down menu, a drop-down menu, etc. The supervisor may select one of the routes by, for example, clicking on the desired route among the list of available routes 202. The supervisor may be asked to confirm the selection by, for example, selecting an accept button 204. The accept button 204 for confirming the selection may be displayed on the second pane 104 while the menu 200 with the routes 202 may be displayed on the first pane 102. Therefore, the confirmation action may require the supervisor to travel from the first pane 102 to the second pane 104 to intentionally select the accept button 204. This configuration may avoid executing a selection by mistake.

When a route 206 is selected for assignment to the aircraft, the selected route 206 may be displayed on the map as a displayed route 210 from departure point to arrival point using visual cues, such as using a first color. This will also allow the supervisor to visually confirm that the intended route is assigned to the autonomous aircraft. The departure point and the arrival point 208 of the selected route may be displayed on the information section corresponding to the selected autonomous aircraft. For example, if the intention were to assign a route from Los Angeles to San Francisco, but the displayed route is from San Diego to Los Angeles, the supervisor may realize the mistake before executing the route assignment command. Once the supervisor confirms that the displayed route 210 is the intended route, the supervisor may execute the assignment by selecting the accept button 204. Execution of the command may result in the assigned route being displayed on the map from departure point to arrival point using different visual cues, such as using a second color to illustrate that the route is now a confirmed route. That is, the GUI 100 relays the transition from a selected route to a confirmed route.

The server computer 1020 coupled to the GUI 100 may continuously receive flight parameters and location positioning signals of the plurality of autonomous aircraft monitored using the GUI 100. The server computer may periodically update the GUI 100 using the flight data and the location positioning signals of the autonomous aircraft to display a relative position of the first icon 116 with respect to the displayed route 210 assigned to the autonomous aircraft as the autonomous aircraft advances along the displayed route 210.

According to various embodiments, the supervisor may choose the amount of detail to be shown on the map. For example, the GUI 100 may have layers of information 250 that can be displayed in an overlaid manner. The supervisor may select one or more of the available layers (e.g., radius information around aircraft 252, wind information 254, telemetry information 256 received from one or more aircraft, any additional information 258) to have a desired level of detail on the map.

Figure 4A:
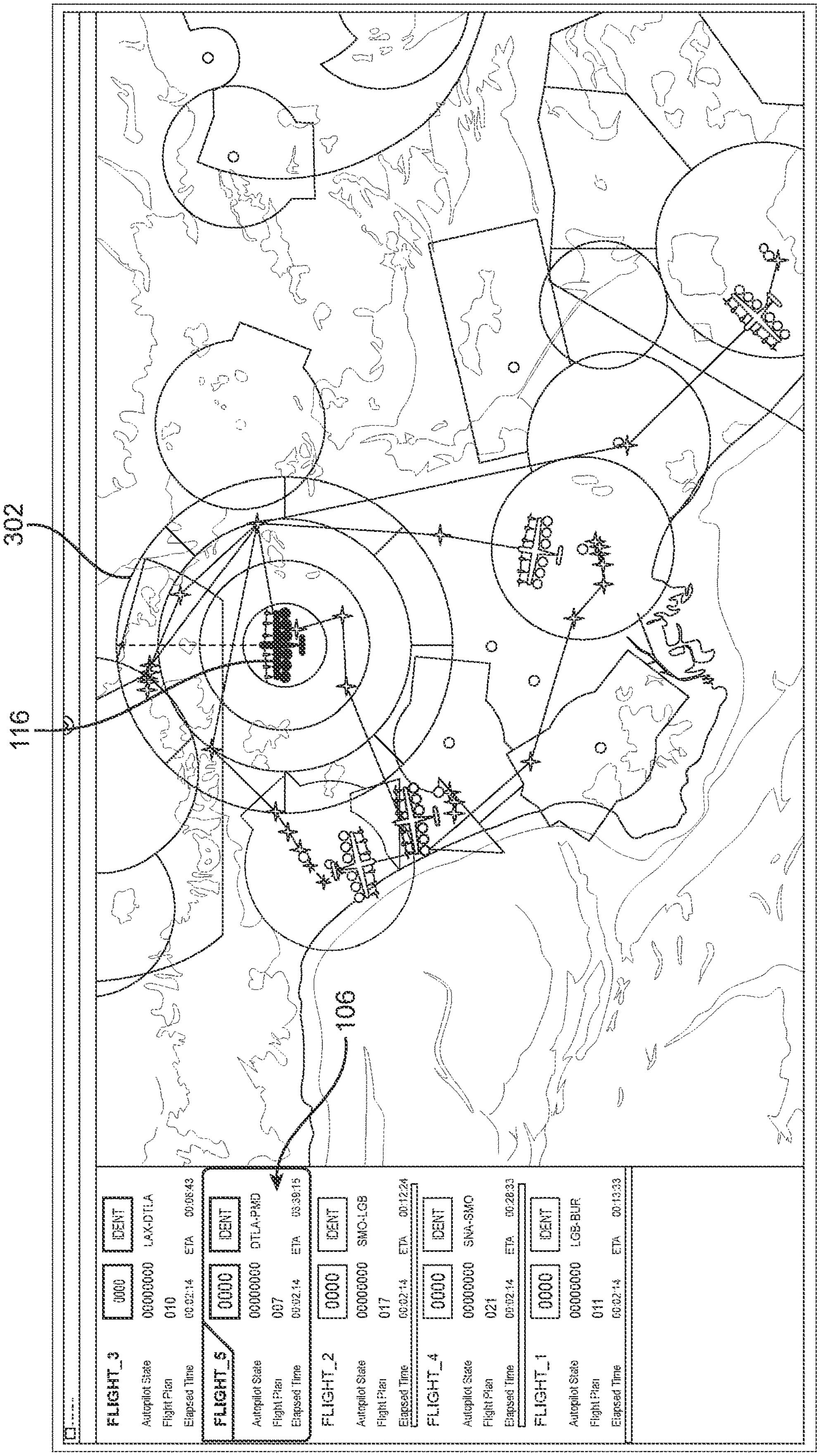
FIG. 4A illustrates adding a layer on the displayed exemplary animated GUI of the flight supervision platform, according to various embodiments.
Figure 4B:
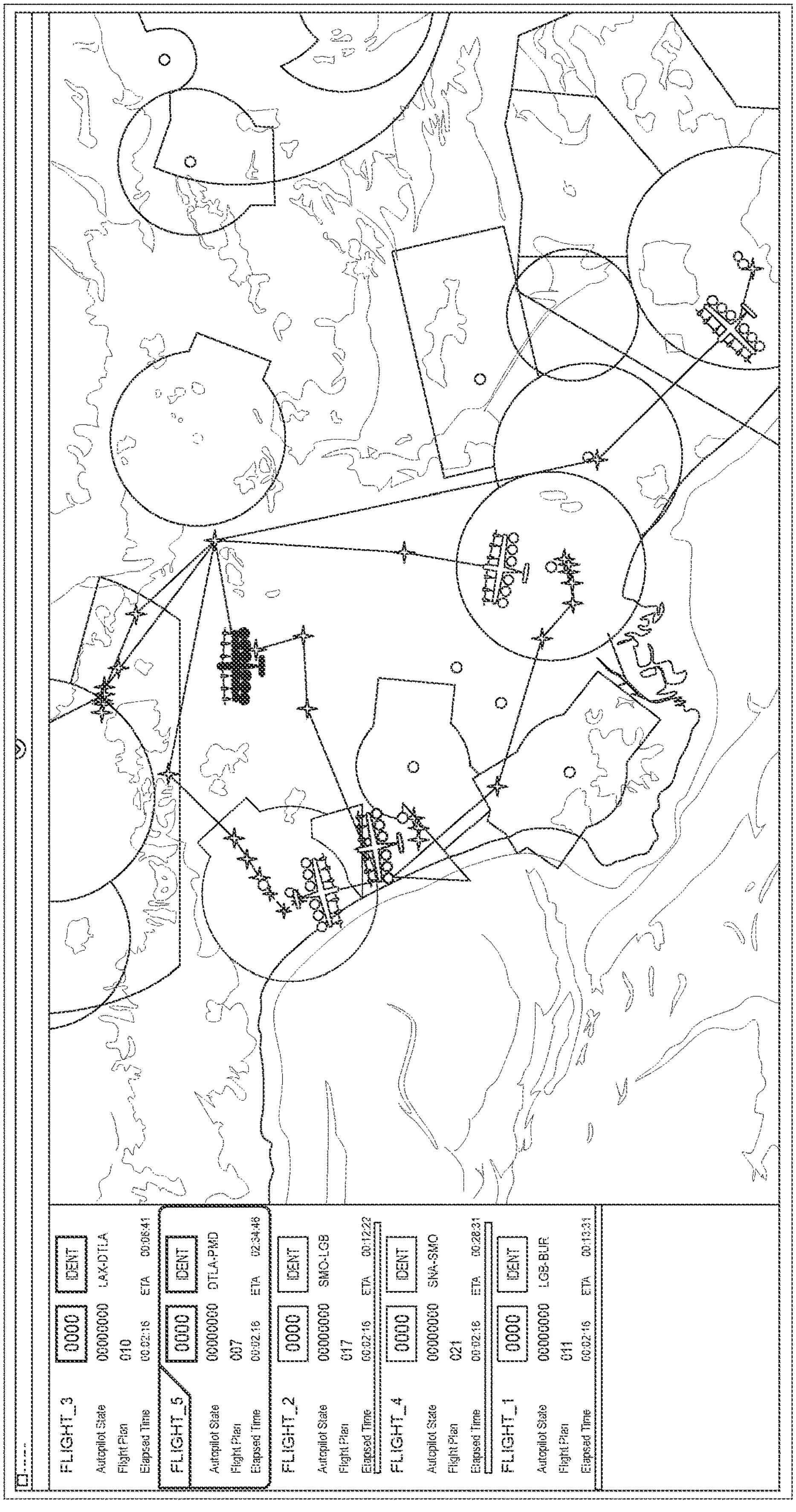
FIG. 4B illustrates removing a layer from the displayed animated GUI of the flight supervision platform, according to various embodiments.

FIGS. 4A-4B illustrate various level of detail displayed on the GUI of the flight supervision platform, according to various embodiments. Specifically, FIG. 4A illustrates adding a layer on the displayed exemplary animated GUI, and FIG. 4B illustrates removing a layer from the displayed animated GUI. FIG. 4A shows a visual aid 302 for illustrating an environment of an autonomous aircraft represented using the aircraft icon 116. For example, the visual aid 302 may be in form of concentric rings, each ring corresponding to a predetermined distance from the autonomous aircraft. This way, the supervisor may quickly see and assess if there are other aircraft, or hazards, in close proximity to the monitored autonomous aircraft. Similarly, the visual aid 302 may also convey information about the distance between the monitored autonomous aircraft and geographical elements (e.g., a mountain) in vicinity of the monitored autonomous aircraft.

If the supervisor prefers a cleaner display, the supervisor may remove the visual aid 302 from the GUI, as shown in FIG. 4B. For example, the visual aid 302 may be displayed when the radius layer 252 (shown in FIG. 3) is selected, and may be removed when the radius layer 252 is un-selected on the GUI 100. While some of the elements of the GUI may not be subject to be masked (e.g., some elements are always displayed and may not be removed by toggling the layers), other elements may be displayed according to the selected options provided on the GUI (e.g., based on selection of the map layers 250 illustrated in FIG. 3).

Figure 5:
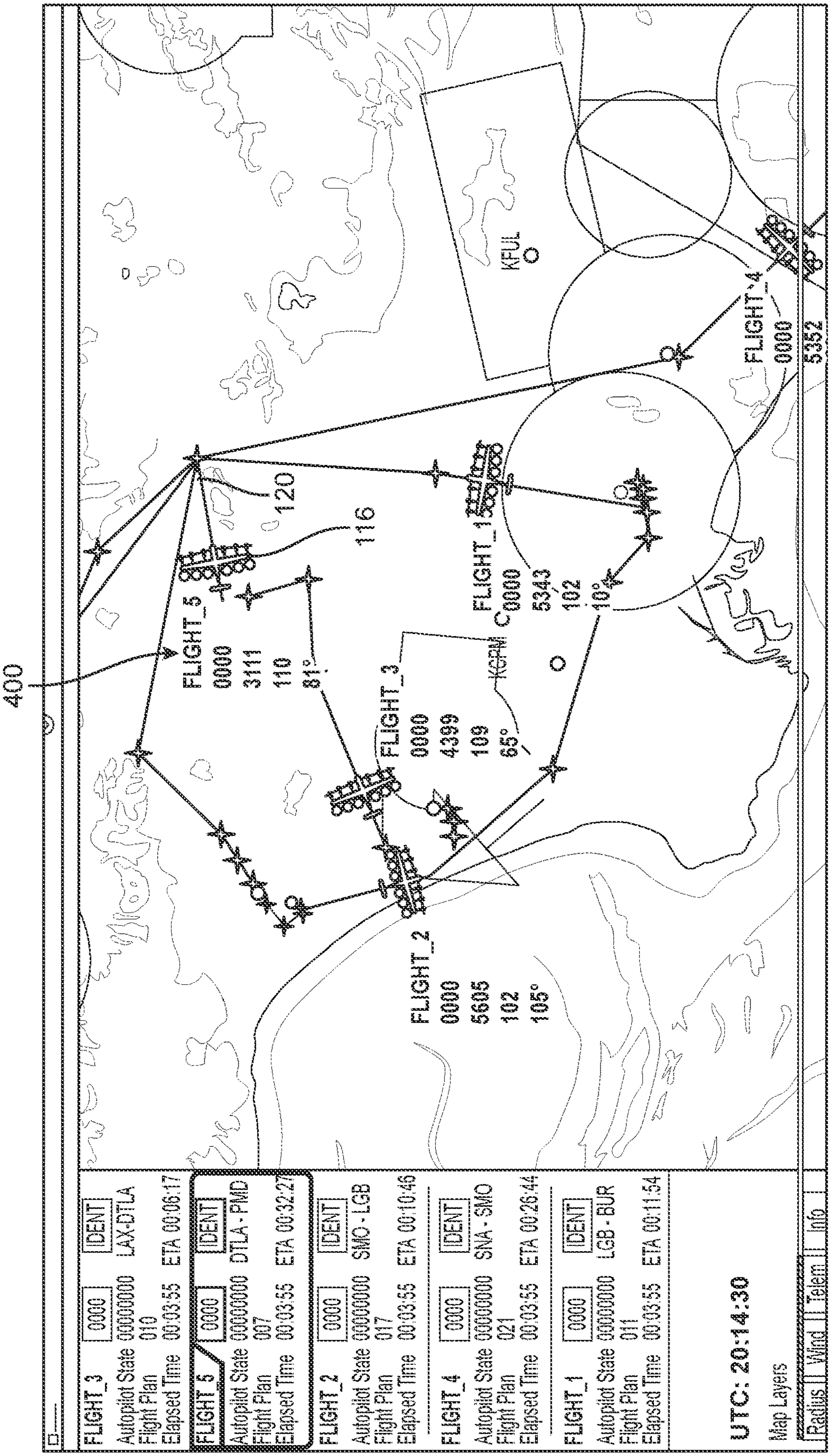
FIG. 5 illustrates tracking an autonomous aircraft during flight using the exemplary animated GUI of the flight supervision platform, according to various embodiments.

As shown in the FIGS. 4-5, the aircraft icons 116, 118 may have additional information 400 displayed on the map in connection with the aircraft icon. For example, flight parameters such as heading, altitude, and/or speed information associated with the autonomous aircraft represented by respective aircraft icons 116, 118 may be displayed next to the aircraft icon 116, 118. In some embodiments, the information 400 may be stuck to the aircraft icon and may move along the displayed path with the aircraft icon.

As shown in FIG. 5, the animated GUI may display the aircraft icon 116 moving along the route 120 assigned to that aircraft. As the autonomous aircraft advances along the assigned route (e.g., flightpath), the corresponding aircraft icon 116 moves along the route 120 on the map. The displayed information 400 moves along with the aircraft icon 116. By having all the information on the same GUI, techniques provided herein ensure that the supervisor is appraised of all relevant information associated with the autonomous aircraft, and selects the right autonomous aircraft when activating a route or when conveying commands to the autonomous aircraft. In some embodiments, the supervisor may toggle between displaying and hiding the displayed information 400. That is, the flight parameters associated with the autonomous aircraft may be selectively displayed in proximity of the first icon representing the autonomous aircraft on the GUI.

According to various embodiments, the autonomous aircraft supervised using the animated GUI 100 are flying autonomously using instrument flight rules (IFR). If ATC instructs the supervisor to communicate a new parameter (e.g., altitude, heading, speed, etc.) to the autonomous aircraft, the supervisor may do so by selecting the aircraft icon 116 and sending a command with the new parameter. In some embodiments, the autonomous aircraft may confirm the receipt of the command and/or the execution of the command with a message transmitted back to the server computer and displayed on the GUI 100.

In some embodiments, the GUI may be displayed at various zoom levels, as selected by the supervisor, or based on a selected action. For example, when assigning a flight path to the autonomous aircraft, the GUI may be displayed at a zoom level that shows both the start point and end point of the route. For example, when entering a flight parameter change command, the GUI may be displayed at a zoom level that better illustrates the surrounding environment of the autonomous aircraft to ensure that the flight parameter modification does not pose an imminent threat to the autonomous aircraft.

Figure 6:
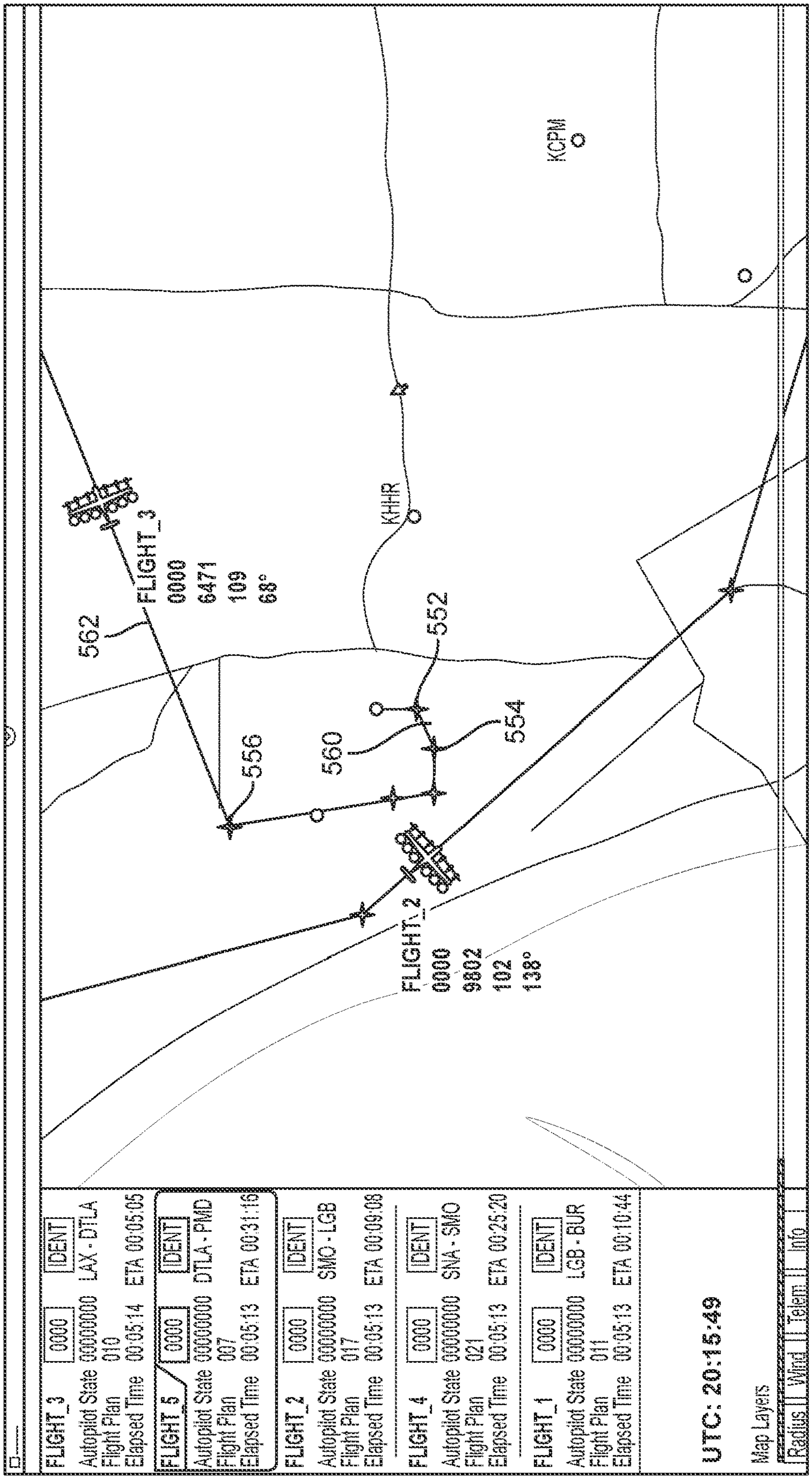
FIG. 6 illustrates a zoomed-in view of the exemplary animated GUI of the flight supervision platform, according to various embodiments.

FIG. 6 illustrates a zoomed-in view of the exemplary animated GUI of the flight supervision platform, according to various embodiments. As shown in FIG. 6, a route may be formed by connecting a plurality of waypoints 552, 554, 556. In some embodiments, a segment 560 (e.g., portion) between the waypoints may change color when the autonomous aircraft has flown over the segment. For example, in the exemplary embodiment illustrated in FIG. 6, the segment 560 (e.g., completed portion of the route) is shown in a first color (e.g., white), illustrating that the segment 560 of the route has been completed, whereas segment 562 (e.g., remaining portion of the route) is shown in a second color (e.g., purple) indicating that the segment has not been completed yet. These visual cues may help the supervisor to gather various types of information simultaneously simply by looking at or observing the GUI. Using the visual cues, the supervisor can keep track of the multiple autonomous aircraft under their supervision.

According to various embodiments, when an aircraft icon 116 is selected on the GUI, the supervisor may select a waypoint on the planned route of the aircraft represented by the aircraft icon 116, and route the aircraft directly to the selected waypoint. For example, if the aircraft were configured to fly from waypoint A to waypoint B and then to waypoint C, the supervisor may select waypoint C and instruct the aircraft to fly from waypoint A directly to waypoint C, skipping waypoint B. As with various commands described herein, the one or more selection inputs on the GUI are transmitted to the autonomous aircraft by the server computer coupled to the GUI.

When an autonomous aircraft completes its flight plan (e.g., arrives at the destination point), the aircraft icon 116 may be shown with one or more visual cues indicating that the autonomous aircraft has completed its flight and has landed.

Figure 7:
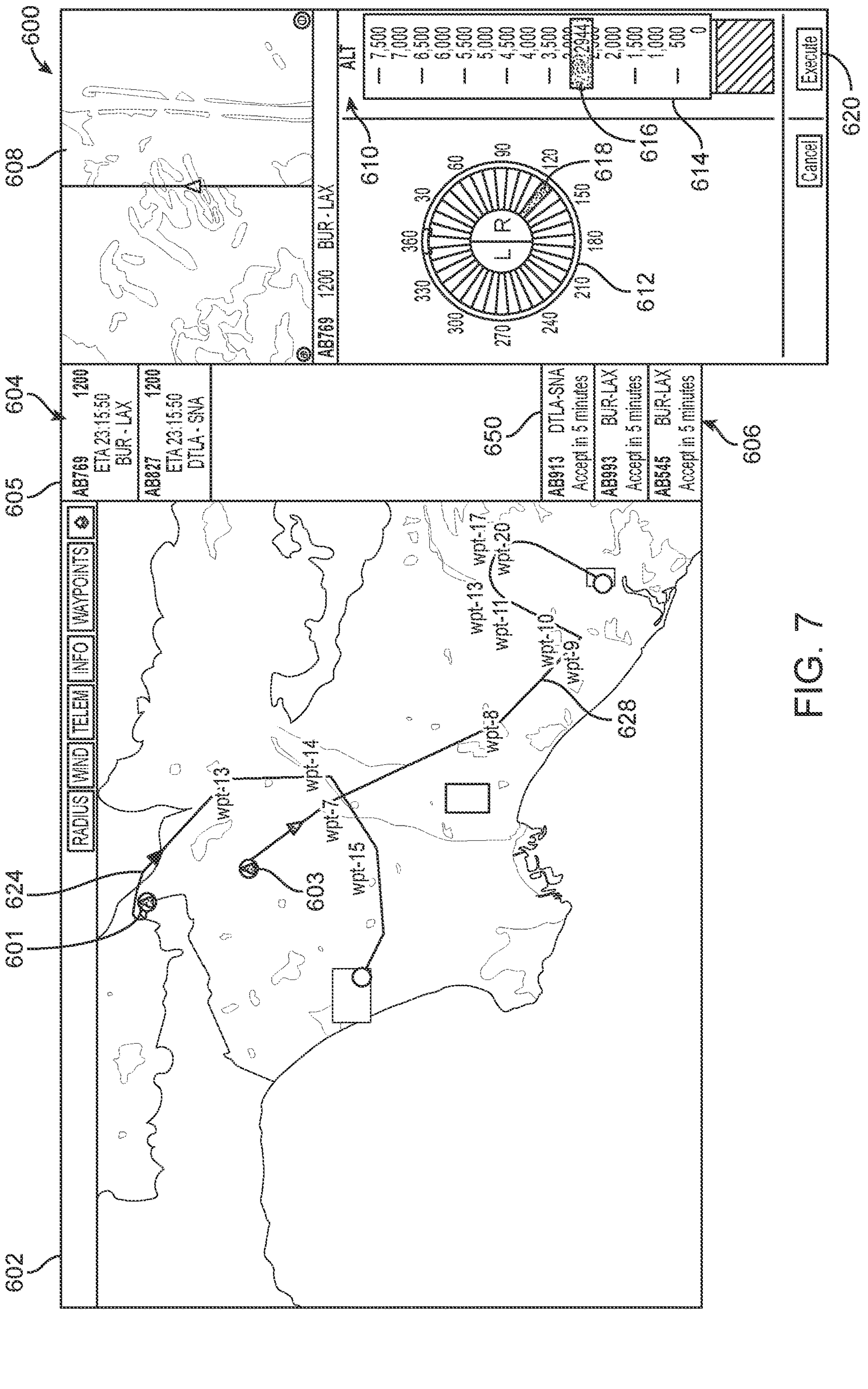
FIG. 7 illustrates another view of the exemplary animated GUI including a flight guidance pane, according to various embodiments.

FIG. 7 illustrates another view of the exemplary animated GUI including a flight guidance pane, according to various embodiments. The exemplary GUI 600 shown in FIG. 7 includes a first pane 602 (similar to the first pane 102 of FIG. 2A) with a plurality of icons 601, 603 each representing an autonomous aircraft supervised using the GUI 600. The exemplary GUI 600 further includes a second pane 604 (similar to the second pane 104 of FIG. 2A) with a plurality of information sections each corresponding to one of the displayed icons on the first pane 602. The first pane 602 and the second pane 604 may illustrate missions (e.g., flights) that are active (e.g., have an active status, or executing a flight plan). The exemplary GUI 600 further includes a third pane 606 displaying a list of missions 650 assigned to the supervisor of the GUI 600. Each mission assignment represents an additional autonomous flight that are being assigned to the supervisor for being monitored by the GUI. That is, the third pane 606 illustrates autonomous aircraft that are being assigned to, but not currently supervised using the GUI 600. For example, the list of missions 650 may include missions that await for the supervisor (e.g., operator) to accept the execution responsibility over them. Once the supervisor accepts and assigned mission, the last preparations before departure can be completed. In some embodiments, the missions on the list 650 may not include all of the assigned missions, but only the assigned missions that are in a state of pre-preparation, as described above. The acceptance of an assigned mission (e.g., autonomous flight) is described below in connection with FIG. 8.

According to various embodiments, the flight supervision platform 1000 may display a message reporting one or more upcoming tasks that may require the supervisor's 1030 approval or acceptance. For example, the upcoming task reminders may be displayed over a predetermined amount of time in a prioritized manner along with the information necessary to avoid human errors or drop in the human performance (e.g., delay in responding to a time- and/or safety-critical event). In some embodiments, the reminder message may have a countdown displayed therein to indicate the remaining time for the supervisor 1030 to act upon the reminder.

Continuing with the description of the exemplary GUI 600, a fourth pane 608 is provided for illustrating a zoomed map view of the selected autonomous aircraft. For example, if the icon 601 is selected on the first pane 602, the corresponding information section 605 is identified on the second pane 604 using visual cues (as described above in connection with FIGS. 2A and 2B), and the immediate area around the selected autonomous aircraft is shown in pane 608 using a zoomed-in map. The exemplary GUI 600 further includes a flight guidance pane 610. The GUI 600 may receive a modification on the flight guidance pane 610 corresponding to a desired change to one or more flight parameters associated with the selected autonomous aircraft (e.g., the aircraft represented with the 601 and information section 605 in the exemplary GUI of FIG. 7). The server computer transmits the command to the autonomous aircraft to effectuate the desired change. According to various embodiments, the flight guidance pane 610 may include one or more of a control dial 612 or 614, a drop down menu, a text entry field, or a widget 620.

For example, the first control dial 612 may enable the supervisor to enter a heading setting or modification for the selected autonomous aircraft. The GUI may display possible heading at predetermined increments. When the supervisor makes a selection, the selected heading may be indicated using a visual cue 618. The second control dial 614 may enable the supervisor to enter an altitude setting or modification for the selected autonomous aircraft. The GUI may display possible altitudes at predetermined increments. When the supervisor makes a selection, the selected heading may be indicated using a visual cue 616. In some embodiments, the flight parameter setting or modification may be entered on a text entry field. When one or more of the flight parameter setting or modifications are completed, the supervisor may select a widget 620 (e.g., "execute" widget) to have the server computer transmit a command to the autonomous aircraft to implement the one or more flight parameter setting or modifications.

Figure 8:
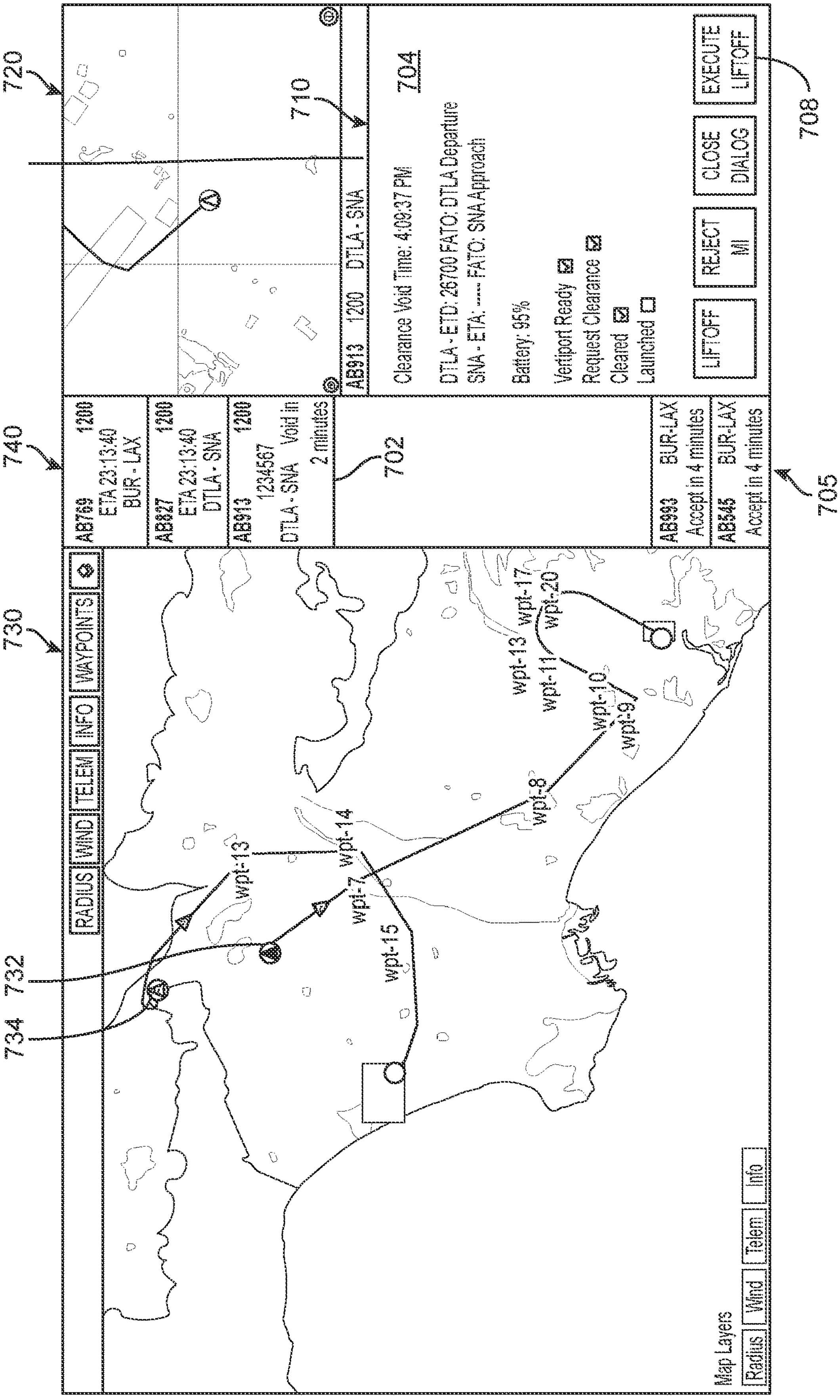
FIG. 8 illustrates another view of the exemplary animated GUI after a mission assignment is accepted, according to various embodiments.

FIG. 8 illustrates another view of the exemplary animated GUI of the flight supervision platform after a mission assignment is accepted, according to various embodiments. As described above, the exemplary GUI 600 shown in FIG. 7 includes a third pane 606 displaying a list of missions 650 assigned to the supervisor of the GUI 600. When the supervisor accepts one of the missions, the mission is moved from the third pane to the second pane that displays a list of active autonomous flights being supervised by the supervisor. As shown in FIG. 8, the supervisor accepted the mission 702, which is removed from the third pane 705 and moved to the second pane 740. The second pane 740 displays all autonomous aircraft supervised and/or managed by the supervisor, regardless of the autonomous aircraft being in flight or on the ground (e.g., waiting to start a mission or recently landed as part of its mission).

When the supervisor accepts a new mission, the flight guidance pane 610 temporality switches to a configuration view 710. The configuration view 710 provides additional information associated with the newly accepted mission including, for example, the points of origin and destination, the estimated departure time, the state of charge of the aircraft, the flight check status, etc. The configuration view 710 may include a text area 704 for displaying the additional information associated with the newly accepted mission, as well as one or more command widgets 708. When the liftoff command is selected on the GUI, the server computer sends the liftoff command to the autonomous aircraft, and the configuration view 710 switches back to the flight guidance pane 610, as shown in FIG. 7.

The autonomous flights managed by the supervisor may be displayed using icons on the first pane 730 of the GUI. According to various embodiments, icons representing autonomous aircraft in flight 732 may have a different representation than icon 734 representing autonomous aircraft on the ground (e.g., preparing for flight or recently landed autonomous aircraft). The icon representing a newly accepted mission may not yet be associated with a flight plan (e.g., route) on the map. The icon may be associated with the flight plan or route on the GUI upon an execute liftoff command is transmitted to the autonomous aircraft by the server computer.

As shown in FIG. 8, the zoomed-in map pane 720 may provide a close-up aerial view of the newly accepted mission's surroundings. The map pane 720 may also indicate the current status of the autonomous aircraft. For example, since the selected autonomous aircraft corresponds to the newly accepted mission 702, the status of the autonomous aircraft is indicated as "transition level 1, transition-climb," meaning that the autonomous aircraft is transitioning to vertical flight mode to liftoff or climb.

According to various embodiments, the server computer coupled to the GUI may receive an input selecting a mission assignment displayed in pane 705. For each selected mission assignment, an individual icon 734 is created in the first pane 730 and a corresponding individual section 702 representing information associated with the selected mission assignment is created in the second pane 740. The accepted mission is then removed from the third pane 705 of the GUI.

According to various embodiments, an entity (e.g., ATC, a third party, another aircraft) may send an alert to the supervisor. In some embodiments, the alert may be received at the flight supervision platform and/or the server computer in communication with the GUI and a visual alert may be displayed on the GUI. The supervisor may choose to either ignore or act on the displayed alert. In some embodiments, the GUI may also display a proposed change or modification to the flight parameters of the monitored autonomous aircraft. The supervisor may accept the proposed change and transmit the command to change the flight parameters to the autonomous aircraft. In some embodiments, in response to the alert, the supervisor may use the flight guidance pane of the GUI to manually enter the desired change to the flight parameters. The server computer may then transmit the command to the autonomous aircraft using the GUI.

In some embodiments, the autonomous aircraft is configured to alter its course to avoid collision with a hazard, or avoid mission failure due to, for example, an electromechanical problem onboard. The autonomous aircraft may alter its course without receiving an approval from the supervisor. In some embodiments, the autonomous aircraft may be configured to wait for an approval for a predetermined amount of time before implementing a change in the flight plan.

According to various embodiments, a dedicated area of the GUI may be reserved for displaying alert messages. For example, feedback or data received from sensors or other equipment of an autonomous aircraft indicating an issue with the aircraft may be displayed as an alert at the dedicated area. In some embodiments, given the importance of an alert, the alert may be displayed as a pop-up screen over a main pane (e.g., the first pane) of the GUI.

Figure 9:
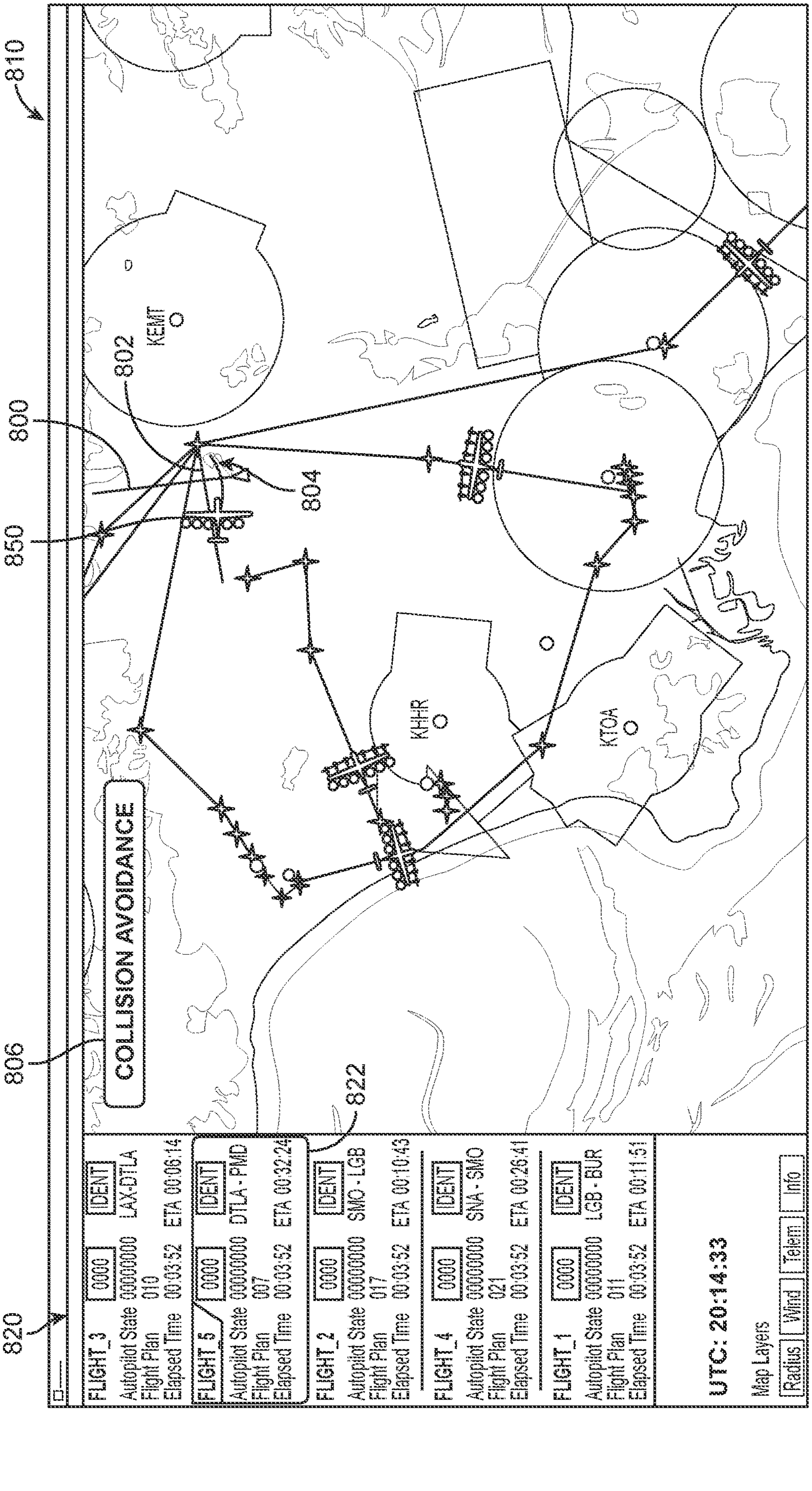
FIG. 9 illustrates an exemplary warning displayed using the exemplary animated GUI of the flight supervision platform, according to various embodiments.

FIG. 9 illustrates an exemplary warning displayed using the exemplary animated GUI, according to various embodiments. In some embodiments, the autonomous aircraft may detect a hazard 800 on its route 802 and may divert from its route 802 to avoid collision with the hazard 800. For example, the autonomous aircraft may bear left or right and alter its course to an alternate route 804 that avoids collision with the hazard 800. In some embodiments, the autonomous aircraft may need to alter its course due to a problem identified with the autonomous aircraft, such as a propeller (e.g., fan) failure. The alternative route 804 and a collision avoidance alert (e.g., warning) 806 are displayed on the GUI to inform the supervisor. In some embodiments, upon communicating the hazard 800 to the flight supervision platform, the autonomous aircraft may ask for a trajectory update. The request for a trajectory update may be displayed on the GUI. The supervisor may provide a response to the trajectory update request by sending, via the server computer, a change to the flight parameters or the flight plan of the autonomous aircraft.

When a warning 806 is displayed on the GUI, the GUI may switch the selected aircraft icon to the aircraft icon associated with the warning 806. For example, the GUI may display icon 805 and corresponding section 822 as the selected autonomous aircraft if the warning is received from, or is otherwise associated with, the autonomous aircraft represented with icon 805 and section 822. In some embodiments, if the alert is displayed for a change already implemented by the autonomous aircraft, the alert may be displayed for a predetermined amount of time prior to switching back to the last selected aircraft by the supervisor.

In some embodiments, ATC may recommend a flight plan change, which can be displayed as an alert on the GUI. The alert may further include a widget displayed on the GUI for the supervisor to accept or decline the recommended flight plan change. If the supervisor accepts the recommended flight plan change, selecting the widget accepting the recommended flight plan change may cause the server computer to transmit a command to the autonomous aircraft to effectuate the recommended the flight plan change (e.g., change the heading as indicated in the recommended flight plan change). The autonomous aircraft executes the received command and starts following the altered flight plan.

Embodiments provide a flight supervision platform (e.g., flight supervision platform 1000 illustrated in FIG. 1) to perform the techniques described herein. The information received from the autonomous aircraft that are being monitored, or any other sources, is analyzed and/or processed by the server computer (e.g., server computer 1020) and transmitted to the GUI (e.g., GUI 1012) for being displayed. Similarly, any input or selection received at the GUI is analyzed and/or processed by the server computer and transmitted to the intended autonomous aircraft over secure communication channel between the server computer and the autonomous aircraft.

Figure 10:
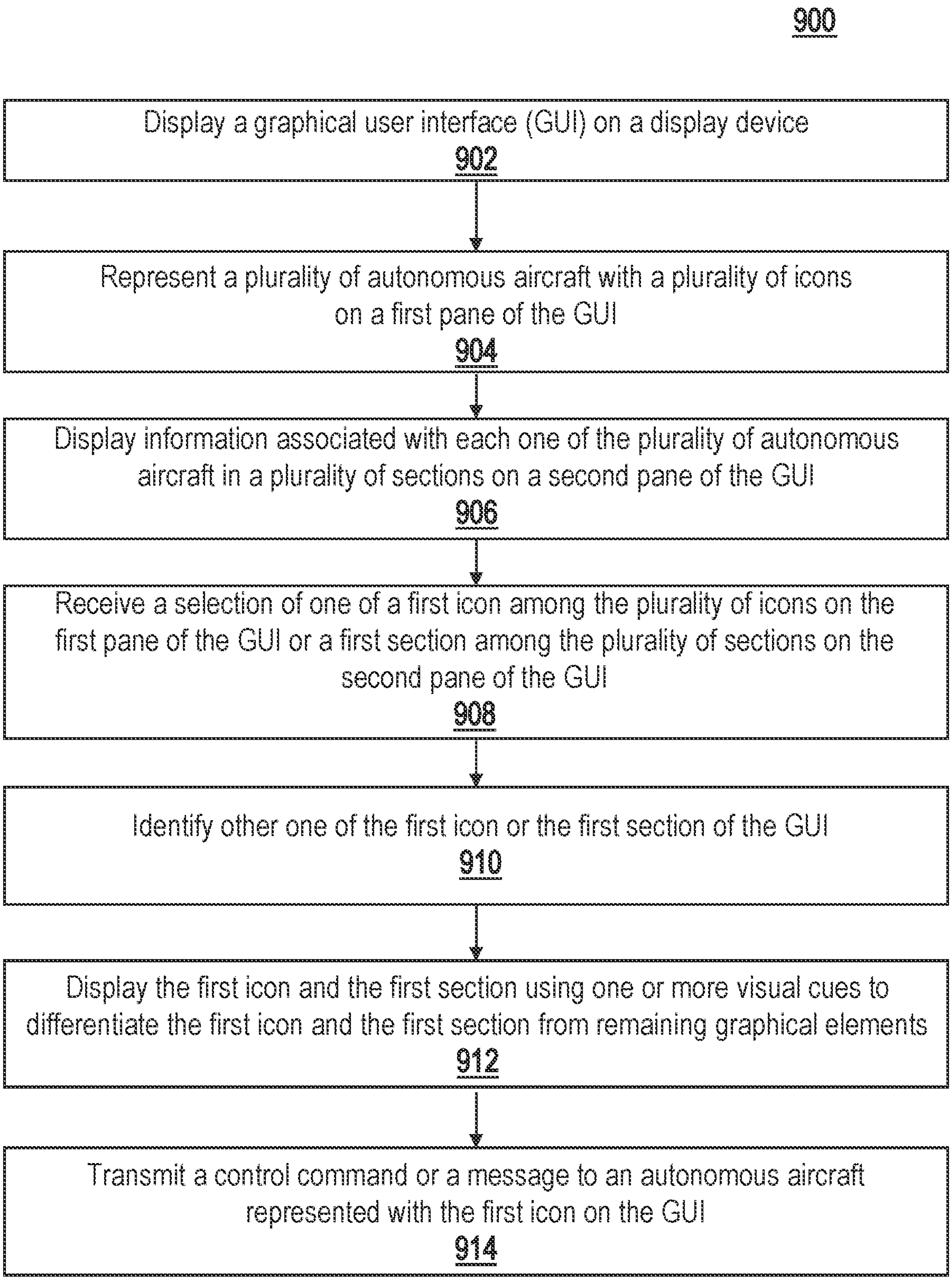
FIG. 10 is a flowchart of an example process performed by a flight supervision platform, according to various embodiments.

FIG. 10 is a flowchart of an example process 900. In some implementations, one or more process blocks of FIG. 10 may be performed by a flight supervision platform.

As shown in FIG. 10, process 900 may include displaying, using a server computer, a graphical user interface (GUI) on a display device (block 902). A plurality of autonomous aircraft are represented on a first pane of the GUI with a plurality of icons (block 904). As further shown in FIG. 10, process 900 may include displaying information associated with each one of the plurality of autonomous aircraft in a plurality of sections on a second pane of the GUI (block 906). The server computer may receive an input selecting (1) one of a first icon among the plurality of icons on the first pane of the GUI or (2) a first section among the plurality of sections on the second pane of the GUI (block 908). The server computer may then identify other one of (1) the first icon among the plurality of icons on the first pane of the GUI or (2) the first section among the plurality of sections on the second pane of the GUI (block 910). The first icon and the first section are displayed on the GUI using one or more visual cues to differentiate the first icon and the first section from remaining graphical elements (block 912). The server computer transmits a command or a message to an autonomous aircraft represented with the first icon on the GUI (block 914).

In some embodiments, flight parameters associated with the autonomous aircraft are displayed in proximity of the first icon representing the autonomous aircraft on the GUI, wherein the flight parameters include one or more of an altitude, a heading or a speed of the autonomous aircraft. According to various embodiments, the method may include receiving flight data messages from the plurality of autonomous aircraft. Each flight data message includes one or more flight parameters associated with one of the plurality of autonomous aircraft. The plurality of icons representing the plurality of autonomous aircraft may be displayed on the GUI along with corresponding one or more flight parameters.

Although FIG. 10 shows example blocks of process 900, in some implementations, process 900 may include additional blocks, fewer blocks, different blocks, or differently arranged blocks than those depicted in FIG. 10. Additionally, or alternatively, two or more of the blocks of process 900 may be performed in parallel.

Embodiments may also provide one or more computer-readable storage media storing instructions that, upon execution on a flight supervision platform including a server computer, cause the server computer to perform the methods described above. Embodiments may also provide a system (e.g., a flight supervision platform) comprising a display screen, and a server computer including one or more processors, and a memory storing instructions that, when executed by the one or more processors, cause the one or more processors to perform the methods described above.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as “bottom,” “top” or “side” and the like can be used to describe an element and/or feature’s relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a “bottom” surface can then be oriented “above” other elements or features. The device can be otherwise oriented (e.g., rotated 90 degrees or at other orientations) and the spatially relative descriptors used herein interpreted accordingly.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Terms “and,” “or,” and “an/or,” as used herein, may include a variety of meanings that also is expected to depend at least in part upon the context in which such terms are used. Typically, “or” if used to associate a list, such as A, B, or C, is intended to mean A, B, and C, here used in the inclusive sense, as well as A, B, or C, here used in the exclusive sense. In addition, the term “one or more” as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term “at least one of” if used to associate a list, such as A, B, or C, can be interpreted to mean any combination of A, B, and/or C, such as A, B, C, AB, AC, BC, AA, AAB, ABC, AABBCCC, etc.

Reference throughout this specification to “one example,” “an example,” “certain examples,” or “exemplary implementation” means that a particular feature, structure, or characteristic described in connection with the feature and/or example may be included in at least one feature and/or example of claimed subject matter. Thus, the appearances of the phrase “in one example,” “an example,” “in certain examples,” “in certain implementations,” or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A computer-implemented method for monitoring and interacting with a plurality of autonomous aircraft, the method comprising:

displaying, using a server computer, a graphical user interface (GUI) on a display device;

representing, by the server computer, a plurality of autonomous aircraft with a plurality of icons on a first pane of the GUI;

receiving flight data from the plurality of autonomous aircraft, wherein the flight data includes one or more flight parameters associated with one of the plurality of autonomous aircraft;

displaying the plurality of icons representing the plurality of autonomous aircraft on the GUI along with corresponding one or more flight parameters;

displaying, by the server computer, information associated with each one of the plurality of autonomous aircraft in a plurality of sections on a second pane of the GUI;

receiving, by the server computer, an input selecting one of a first icon among the plurality of icons on the first pane of the GUI or a first section among the plurality of sections on the second pane of the GUI;

identifying, by the server computer, other one of the first icon among the plurality of icons on the first pane of the GUI or the first section among the plurality of sections on the second pane of the GUI;

displaying, by the server computer, the first icon and the first section using one or more visual cues to differentiate the first icon and the first section from remaining graphical elements; and transmitting, by the server computer, a command or a message to an autonomous aircraft represented with the first icon on the GUI.

2. The method of claim 1, further comprising:

displaying one or more mission assignments on a third pane the GUI, each mission assignment representing an additional autonomous flight to be monitored by the GUI;

receiving an input selecting at least one of the one or more mission assignments;

for each selected mission assignment:

generating an individual icon and individual section representing information associated with the selected mission assignment;

displaying the individual icon on the first pane of the GUI;

displaying the individual section on the second pane of the GUI; and removing the selected mission from the third pane of the GUI.

3. The method of claim 1, further comprising:

displaying a flight guidance pane on the GUI;

receiving a modification on the flight guidance pane corresponding to a desired change in one or more flight parameters associated with the autonomous aircraft represented with the first icon; and transmitting, to the autonomous aircraft represented with the first icon, the command effectuating the desired change.

4. The method of claim 3, wherein the flight guidance pane includes one or more of a control dial, a drop down menu, a text entry field, or a widget.

5. The method of claim 1, wherein the plurality of icons are overlaid on a map displayed on the first pane, wherein the first pane is larger than the second pane on the display device.

6. The method of claim 1, further comprising:

displaying a list of one or more routes on the GUI;

receiving a selection of a route from the list;

assigning the route to the autonomous aircraft represented with the first icon on the GUI, wherein the autonomous aircraft executes a flight plan to follow the route upon receiving route assignment; and periodically updating the GUI to display a relative position of the first icon with respect to the route assigned to the autonomous aircraft as the autonomous aircraft advances along the route.

7. The method of claim 6, further comprising:

displaying, on the GUI, a portion of the route that is completed using a first visual cue, and a remaining portion of the route using a second visual cue.

8. The method of claim 1, further comprising:

selectively displaying flight parameters associated with the autonomous aircraft in proximity of the first icon representing the autonomous aircraft on the GUI, wherein the flight parameters include one or more of an altitude, a heading or a speed of the autonomous aircraft.

9. The method of claim 1, further comprising:

receiving a message from the autonomous aircraft, the message indicating a hazard detected by the autonomous aircraft along a route and an alternate route followed by the autonomous aircraft; and displaying a collision avoidance alert, and the alternate route on the GUI.

10. The method of claim 1, further comprising:

receiving location positioning signals from the plurality of autonomous aircraft; and displaying the plurality of icons representing the plurality of autonomous aircraft on a map based on the location positioning signals.

11. A system for monitoring and interacting with a plurality of autonomous aircraft, the system comprising:

a display screen, one or more processors, and a memory storing instructions that, when executed by the one or more processors, cause the one or more processors to perform steps comprising:

displaying a graphical user interface (GUI) on a display device;

representing a plurality of autonomous aircraft with a plurality of icons on a first pane of the GUI;

receiving flight data from the plurality of autonomous aircraft, wherein the flight data includes one or more flight parameters associated with one of the plurality of autonomous aircraft;

displaying the plurality of icons representing the plurality of autonomous aircraft on the GUI along with corresponding one or more flight parameters;

displaying information associated with each one of the plurality of autonomous aircraft in a plurality of sections on a second pane of the GUI;

receiving an input selecting one of a first icon among the plurality of icons on the first pane of the GUI or a first section among the plurality of sections on the second pane of the GUI;

identifying other one of the first icon among the plurality of icons on the first pane of the GUI or the first section among the plurality of sections on the second pane of the GUI;

displaying the first icon and the first section using one or more visual cues to differentiate the first icon and the first section from remaining graphical elements; and transmitting a command or a message to an autonomous aircraft represented with the first icon on the GUI.

12. The system of claim 11, wherein the instructions, when executed by the one or more processors, cause the one or more processors to perform steps further comprising:

displaying one or more mission assignments on a third pane the GUI, each mission assignment representing an additional autonomous flight to be monitored by the GUI;

receiving an input selecting at least one of the one or more mission assignments;

for each selected mission assignment:

generating an individual icon and individual section representing information associated with the selected mission assignment;

displaying the individual icon on the first pane of the GUI;

displaying the individual section on the second pane of the GUI; and removing the selected mission from the third pane of the GUI.

13. The system of claim 11, wherein the instructions, when executed by the one or more processors, cause the one or more processors to perform steps further comprising:

displaying a list of one or more routes on the GUI;

receiving a selection of a route from the list;

assigning the route to the autonomous aircraft represented with the first icon on the GUI;

periodically updating the GUI to display a relative position of the first icon with respect to the route assigned to the autonomous aircraft as the autonomous aircraft advances along the route; and displaying, on the GUI, a portion of the route that is completed using a first visual cue, and a remaining portion of the route using a second visual cue.

14. The system of claim 11, wherein the instructions, when executed by the one or more processors, cause the one or more processors to perform steps further comprising:

displaying a flight guidance pane on the GUI;

receiving a modification on the flight guidance pane corresponding to a desired change in one or more flight parameters associated with the autonomous aircraft represented with the first icon; and transmitting, to the autonomous aircraft represented with the first icon, the command effectuating the desired change.

15. The system of claim 11, wherein the instructions, when executed by the one or more processors, cause the one or more processors to perform steps further comprising:

displaying flight parameters associated with the autonomous aircraft in proximity of the first icon representing the autonomous aircraft on the GUI, wherein the flight parameters include one or more of an altitude, a heading or a speed of the autonomous aircraft.

16. The system of claim 11, wherein the instructions, when executed by the one or more processors, cause the one or more processors to perform steps further comprising:

receiving a message from the autonomous aircraft, the message indicating a hazard detected by the autonomous aircraft along a route and an alternate route followed by the autonomous aircraft; and displaying a collision avoidance alert, and the alternate route on the GUI.

17. The system of claim 11, wherein the instructions, when executed by the one or more processors, cause the one or more processors to perform steps further comprising:

receiving location positioning signals from the plurality of autonomous aircraft; and displaying the plurality of icons representing the plurality of autonomous aircraft on a map based on the location positioning signals.

18. One or more computer-readable storage media storing instructions that, upon execution on a flight supervision platform having a server computer, cause the server computer to perform steps comprising:

displaying a graphical user interface (GUI) on a display device;

representing a plurality of autonomous aircraft with a plurality of icons on a first pane of the GUI;

receiving flight data from the plurality of autonomous aircraft, wherein the flight data includes one or more flight parameters associated with one of the plurality of autonomous aircraft;

displaying the plurality of icons representing the plurality of autonomous aircraft on the GUI along with corresponding one or more flight parameters;

displaying information associated with each one of the plurality of autonomous aircraft in a plurality of sections on a second pane of the GUI;

receiving an input selecting one of a first icon among the plurality of icons on the first pane of the GUI or a first section among the plurality of sections on the second pane of the GUI;

identifying other one of the first icon among the plurality of icons on the first pane of the GUI or the first section among the plurality of sections on the second pane of the GUI;

displaying the first icon and the first section using one or more visual cues to differentiate the first icon and the first section from remaining graphical elements; and transmitting a command or a message to an autonomous aircraft represented with the first icon on the GUI.

* * * * *